US010838871B2

(12) United States Patent
Sadasivam

(10) Patent No.: US 10,838,871 B2
(45) Date of Patent: Nov. 17, 2020

(54) HARDWARE PROCESSOR ARCHITECTURE HAVING A HINT CACHE

(71) Applicant: International Business Machines Corporation, Armonk, NY (US)

(72) Inventor: Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/344,624

(22) Filed: Nov. 7, 2016

(65) Prior Publication Data

US 2018/0129629 A1 May 10, 2018

(51) Int. Cl.
*G06F 12/0846* (2016.01)
*G06F 12/0875* (2016.01)
*G06F 12/0893* (2016.01)

(52) U.S. Cl.
CPC ...... *G06F 12/0875* (2013.01); *G06F 12/0848* (2013.01); *G06F 12/0893* (2013.01); *G06F 2212/1016* (2013.01); *G06F 2212/452* (2013.01)

(58) Field of Classification Search
CPC .. G06F 9/382; G06F 12/0848; G06F 12/0875; G06F 12/0893
See application file for complete search history.

(56) References Cited

U.S. PATENT DOCUMENTS

| 8,443,171 B2 * | 5/2013 | Morris | G06F 9/3848 712/207 |
| 2010/0169606 A1 | 7/2010 | Deneau | |
| 2013/0166881 A1 * | 6/2013 | Choquette | G06F 9/3802 712/206 |
| 2015/0100763 A1 * | 4/2015 | Holm | G06F 9/30145 712/210 |
| 2016/0077834 A1 | 3/2016 | de Perthuis | |
| 2016/0216966 A1 * | 7/2016 | Dice | G06F 9/30079 |
| 2017/0286110 A1 * | 10/2017 | Agron | G06F 9/3016 |

* cited by examiner

*Primary Examiner* — Benjamin P Geib
(74) *Attorney, Agent, or Firm* — Richard B. Thomas

(57) ABSTRACT

Aspects of the disclosure relate to a hardware processor architecture. The hardware processor architecture may include a processor cache to manage a set of instructions. The hardware processor architecture may include a hint cache to manage a set of hints associated with the set of instructions. Disclosed aspects relate to establishing a hint cache which has a set of hints associated with the set of instructions. The hint cache may be established with respect to the processor cache which has a set of instructions. The set of instructions may be accessed from the processor cache. From the hint cache, the set of hints associated with the set of instructions may be communicated. The set of instructions may be processed by the hardware processor using the set of hints associated with the set of instructions. In embodiments, static or dynamic hint cache bits can be utilized.

20 Claims, 7 Drawing Sheets

100

HARDWARE PROCESSOR ARCHITECTURE HAVING A HINT CACHE

BACKGROUND

This disclosure relates generally to computer systems and, more particularly, relates to a hardware processor architecture. Computer systems may make use of hardware processors to manage sets of instructions for computer programs. As computer systems increase in complexity, the amount of instructions managed by hardware processors may increase. As the amount of instructions managed by hardware processors increases, the need for management of the instructions may also increase.

SUMMARY

Aspects of the disclosure relate to a hardware processing architecture having a hint cache for managing a set of instructions. In certain embodiments, compiler/static analysis software may be used to analyze the various levels of the program structure of a program file, and generate hints to facilitate execution of the set of instructions of the file by a processor. Upon execution of the set of instructions, the generated hints may be accessed by the hardware processor from the hint cache. In embodiments, the hint cache may include a static hint cache for maintaining static hints generated based on the analysis of the set of instructions. In various embodiments, the hint cache may include a dynamic hint cache for maintaining dynamic hints generated based on real-time execution of the set of instructions by the processor.

Aspects of the disclosure relate to a hardware processor architecture. The hardware processor architecture may include a processor cache to manage a set of instructions. The hardware processor architecture may include a hint cache to manage a set of hints associated with the set of instructions. Disclosed aspects relate to establishing a hint cache which has a set of hints associated with the set of instructions. The hint cache may be established with respect to the processor cache which has a set of instructions. The set of instructions may be accessed from the processor cache. From the hint cache, the set of hints associated with the set of instructions may be communicated. The set of instructions may be processed by the hardware processor using the set of hints associated with the set of instructions.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
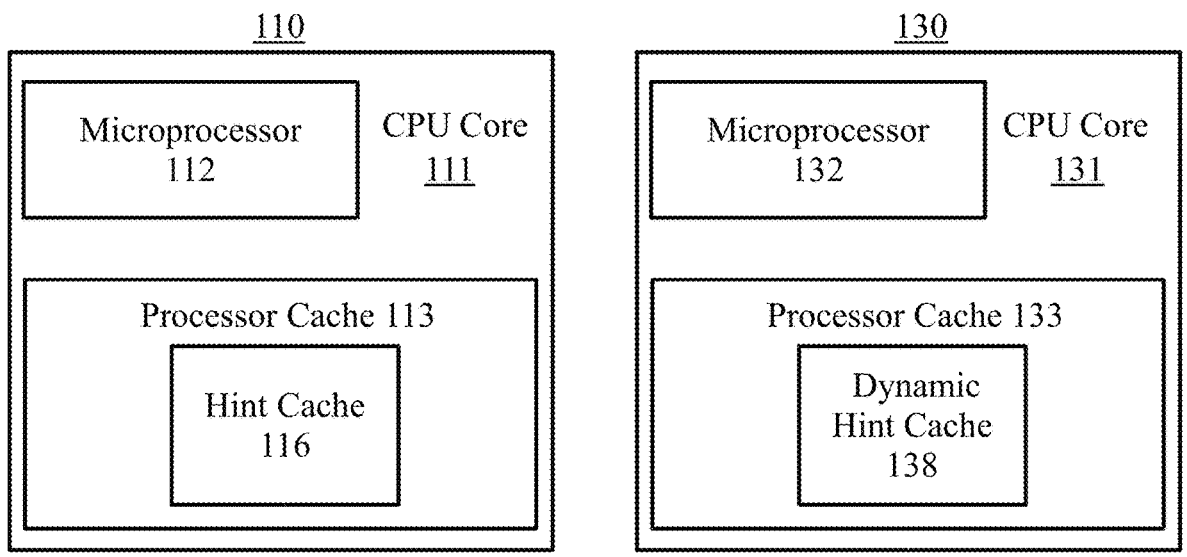
FIG. 1A depicts a set of example hardware processor architectures for implementing aspects of a hint cache, according to embodiments.
Figure 1A:
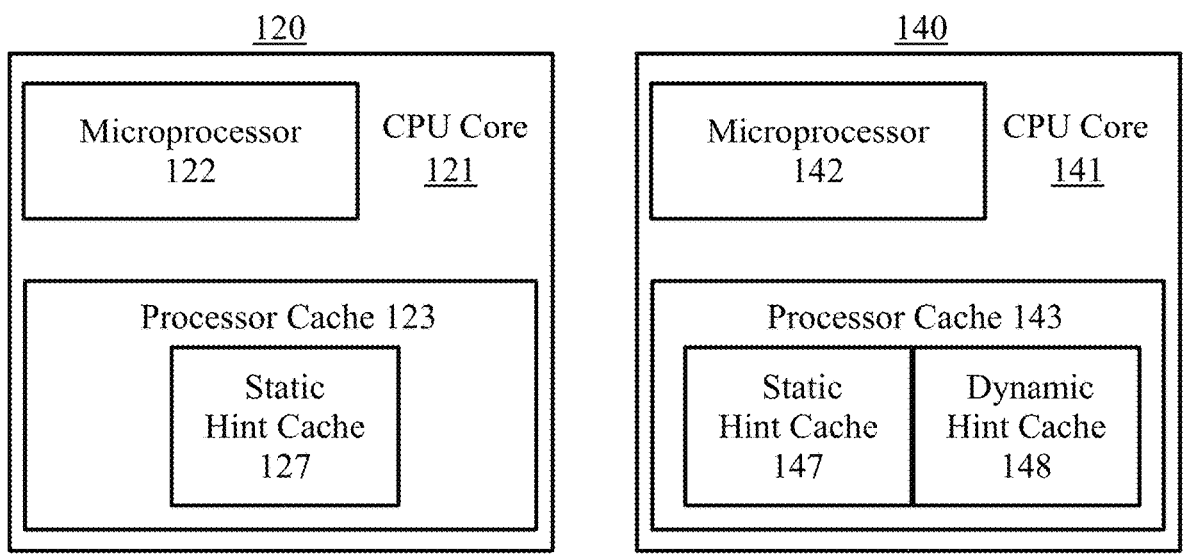

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to a hardware processing architecture having a hint cache for managing a set of instructions. Compiler/static analysis software may be used to analyze the various levels of the program structure of a program file (e.g., uncompiled source code), and generate hints to facilitate execution of the set of instructions of the file by a processor. Upon execution of the set of instructions, the generated hints may be accessed by the hardware processor from the hint cache. The hint cache may include a static hint cache for maintaining static hints generated based on the analysis of the set of instructions (e.g., prior to runtime). The hint cache may include a dynamic hint cache for maintaining dynamic hints generated based on real-time execution of the set of instructions by the hardware processor. Leveraging hints related to the set of instructions of a file may be associated with streamlined instruction performance, program sequence flexibility, and processing efficiency.

Hardware processors are one component used by computers to process information and execute computer program instructions. Aspects of the disclosure relate to the recognition that the limited size of hardware processor instruction windows can impact a processor's ability to understand the high-level structure of programs and identify aspects of the program that may be executed more efficiently. Accordingly, aspects of the disclosure relate to an architecture for a hardware processor that includes a hint cache (e.g., within the processor cache) for maintaining hints regarding a set of program instructions. The set of hints may be derived based on an analysis of the program structure prior to execution (e.g., with respect to a compilation phase) or based on real-time execution of the set of program instructions. The set of hints may be maintained in the hint cache of the hardware processor, such that when a set of program instructions are loaded into the hardware processor, the set of hints may also be fetched from the hint cache to facilitate execution of the set of program instructions. In this way, the high-level program structure of a set of instructions may be leveraged to promote efficient operation of computer programs.

Aspects of the disclosure include a hardware processor architecture, method, and system for using a hint cache to facilitate management of a set of instructions. The hardware processor architecture may include a processor cache to manage a set of instructions. The hardware processor architecture may include a hint cache to manage a set of hints associated with the set of instructions. In embodiments, the processor cache may include the hint cache. In embodiments, the hint cache may have a static hint cache. In embodiments, the hint cache may have a dynamic hint cache. In embodiments, the processor cache may have an instruction cache. In embodiments, the processor cache may have a micro-op cache. In certain embodiments, the static hint cache may be derived from an application program binary.

Aspects of the disclosure relate to establishing a hint cache which has a set of hints associated with the set of instructions. The hint cache may be established with respect to the processor cache which has a set of instructions. The set of instructions may be accessed from the processor cache. From the hint cache, the set of hints associated with the set of instructions may be communicated. The set of instructions may be processed by the hardware processor using the set of hints associated with the set of instructions. In embodiments, the processor cache may be structured to include the hint cache. In embodiments, the set of instructions may be loaded in the processor cache, and the set of hints associated with the set of instructions may be loaded in the hint cache. In embodiments, the set of instructions may be executed by the hardware processor, and the set of hints may be determined based on the execution of the set of instructions. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

Turning now to the Figures, FIG. 1A depicts a set of example hardware processor architectures 100 for implementing aspects of a hint cache, according to embodiments. Aspects of FIG. 1A relate to a plurality of hardware processor architectures configured to leverage a hint cache to facilitate execution of a set of instructions using a set of hints. As shown in FIG. 1A, the set of example hardware processor architectures 100 may include a first hardware processor architecture 110, a second hardware processor architecture 120, a third hardware processor architecture 130, and a fourth hardware processor architecture 140. The plurality of hardware processor architectures depicted in FIG. 1A are described illustratively according to various embodiments, and are not meant to indicate necessity of a particular configuration or exclusivity of other potential configurations (or functions/purposes/components as applied to a specific configuration).

In embodiments, the set of example hardware processor architectures 100 may include a first hardware processor architecture 110. Aspects of the first hardware processor architecture 110 relate to utilizing a hint cache 116 to facilitate execution of program instructions. The first hardware processor architecture 110 may include a CPU (central processing unit) core 111 configured to carry out the instructions of a computer program by performing the arithmetic, logical, control, and input/output operations specified by the instructions. The CPU core may include a microprocessor 112. The microprocessor 112 may include one or more integrated circuits configured to use combinational logic and sequential digital logic techniques to access and perform operations stored in the processor cache 113. The processor cache 113 may include a hardware or software component configured to store data such that future requests for that data (e.g., by a microprocessor) may be served more quickly (e.g., as opposed to fetching data from a main memory). In embodiments, the processor cache 113 may be configured to store and manage a set of instructions. The set of instructions can include commands, tasks, requests, or other directions to perform processing operations. For instance, the set of instructions may include commands to perform arithmetic operations (e.g., addition, subtraction), logic operations (e.g., and, or, not), data management operations (e.g., move, input, output, load, store, read, write), or control flow operations (e.g., goto, if . . . , call, return). In embodiments, the set of instructions may be received from a computer program. As an example, the set of instructions may include operations to execute a database management application.

In embodiments, aspects of the disclosure relate to a processor cache 113 that includes a hint cache 116. Generally, the hint cache 116 may include a portion of high-speed memory (e.g., static random access memory) configured for storage of a set of hints. The set of hints may include data or information configured to facilitate execution of the set of instructions by the microprocessor 113. For instance, the set of hints may include a plurality of different hints, where each hint is associated with one or more instructions of the set of instructions. In embodiments, the set of hints may include one or more hint bits to indicate a nature of one or more instructions of the set of instructions. The set of hint bits may include binary digits (e.g., 0, 1) configured to represent a recommended operation with respect to the set of instructions. When the set of instructions is processed, the microprocessor 113 may be configured to access the hint cache 116 to obtain the hints (e.g., hint bits) associated with each instruction, and use the hints to facilitate execution of the set of instructions. As examples, the set of hints may include data specifying instructions that may be carried out simultaneously, instructions to be carried out in a particular order, branch paths that should be taken or avoided in certain situations/parameter configurations, instructions that are dependent upon other instructions, software elements, resource configurations, or the like. Other configurations for the hardware processor architecture are also possible.

In embodiments, the set of example hardware processor architectures 100 may include a second hardware processor architecture 120. Aspects of the second hardware processor architecture 120 relate to a processor cache 123 including a static hint cache 127. The second hardware processor architecture 120 may include a CPU core 121 having a microprocessor 122 for processing a set of instructions stored in the processor cache 127. In embodiments, as described herein, the second hardware processor architecture 120 may include a static hint cache 127. Generally, the static hint cache 127 may include a portion of high-speed memory (e.g., static random access memory) configured for storage of a set of hints derived from the set of instructions prior to runtime. In embodiments, the static hint cache 127 may be derived from (e.g., loaded from, analyzed and determined using an independent static analysis tool) an application binary. As examples, uncompiled source code, binary files, executable files, or other types of program files may be analyzed prior to execution to identify dependencies between instructions, branch paths associated with different resource requirements, efficient instruction execution sequences, or other information that could be used to facilitate instruction execution. Hint data ascertained from analysis of the set of instructions may be collected (e.g., by a compiler) and stored in the static hint cache 127. The hint data stored in the static hint cache 127 may be used to facilitate execution of the set of instructions. Other configurations for the hardware processor architecture are also possible.

In embodiments, the set of example hardware processor architectures 100 may include a third hardware processor architecture 130. Aspects of the third hardware processor architecture 130 relate to a processor cache 133 including a dynamic hint cache 138. The third hardware processor architecture 130 may include a CPU core 131 having a microprocessor 132 for processing a set of instructions stored in the processor cache 133. In embodiments, the third hardware processor architecture 130 may include a dynamic hint cache 138. Generally, the dynamic hint cache 138 may include a portion of high-speed memory (e.g., static random access memory) configured for storage of a set of hints determined based on real-time execution of the set of instructions. For instance, the set of instructions for an executable file may be processed and performed by the microprocessor 132. Based on the operation of the set of instructions, hint data may be collected regarding the difficulty of executing particular instruction branches, resource requirements for different instructions, particular instructions that may be performed simultaneously or in a different order, or instructions that may be fused together to positively impact performance. The hint data collected based on operation of the program file may be saved in the dynamic hint cache 138 to facilitate subsequent execution of the set of instructions. Other configurations for the hardware processor architecture are also possible.

In embodiments, the set of example hardware processor architectures 100 may include a fourth hardware processor architecture 140. Aspects of the fourth hardware processor architecture 140 relate to a processor cache 143 including both a static hint cache 147 and a dynamic hint cache 148. The fourth hardware processor architecture 140 may include a CPU core 141 having a microprocessor 142 for processing a set of instructions stored in the processor cache 143. In embodiments, as described herein, the fourth hardware processor architecture 140 may include both a static hint cache 147 and a dynamic hint cache 148. As described herein, aspects of the disclosure relate to collecting a set of hint data prior to execution of a program file (e.g., static hint data), as well as collecting a set of hint data based on real-time operation of the program (e.g., dynamic hint data). Accordingly, in certain embodiments, the processor cache 143 of a CPU core 141 may be configured to include both a static hint cache 147 for storage of static hint data as well as a dynamic hint cache 148 for storage of dynamic hint data. In this way, both the static hint cache 147 and the dynamic hint cache 148 may be leveraged to facilitate management and execution of the set of instructions for a program. Other configurations for the hardware processor architecture are also possible.

Figure 1B:
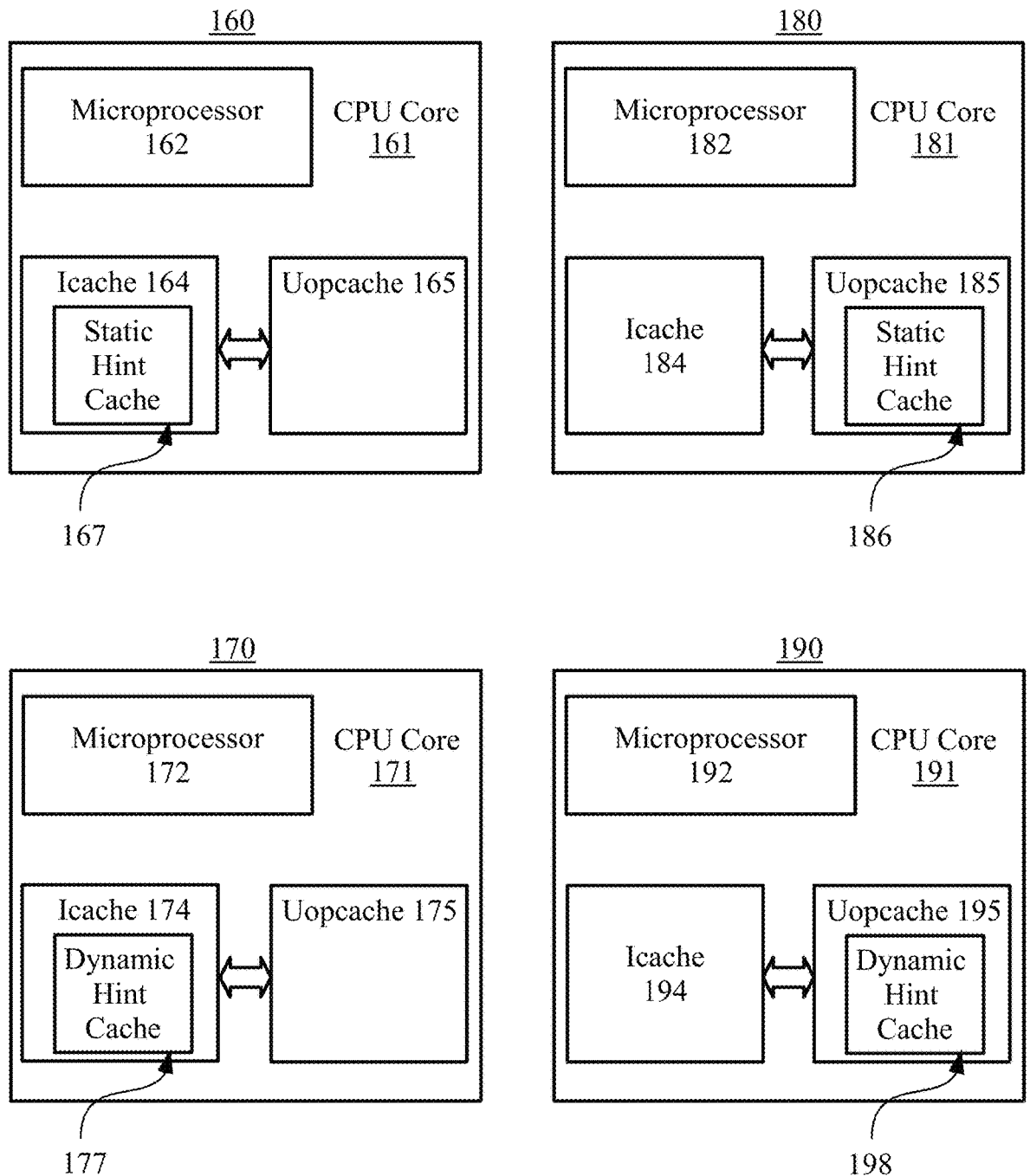
FIG. 1B depicts a set of example hardware processor architectures for implementing aspects of a hint cache, according to embodiments.

FIG. 1B depicts a set of example hardware processor architectures 150 for implementing aspects of a hint cache, according to embodiments. Aspects of FIG. 1B relate to a plurality of hardware processor architectures configured to leverage a hint cache to facilitate execution of a set of instructions using a set of hints. As shown in FIG. 1B, the set of example hardware processor architectures 150 may include a first hardware processor architecture 160, a second hardware processor architecture 170, a third hardware processor architecture 180, and a fourth hardware processor architecture 190. The plurality of hardware processor architectures depicted in FIG. 1B are described illustratively according to various embodiments, and are not meant to indicate necessity of a particular configuration or exclusivity of other potential configurations (or functions/purposes/components as applied to a specific configuration).

In embodiments, the set of example hardware processor architectures 150 may include a first hardware processor architecture 160. Aspects of the first hardware processor architecture 160 relate to an instruction cache (Icache) 164 including a static hint cache 167. The first hardware processor architecture 160 may include a CPU core 161 having a microprocessor 162 for processing a set of instructions stored in the Icache 164. In embodiments, the Icache 164 may include a portion of high-speed memory configured for storage of a set of instructions for a computer program. Aspects of the disclosure relate to the recognition that, in embodiments, it may be desirable to maintain instructions for execution of a program separate from other data (e.g., instructions and data may have different access patterns and fetch from different regions of memory, such that separate storage may be associated with throughput efficiency). Accordingly, in embodiments, the Icache 164 may be configured to include a static hint cache 167. As described herein, the static hint cache 167 may be configured to maintain a set of hints derived from the set of instructions prior to runtime. In embodiments, the CPU core 161 may include a micro-operation (Uop) cache 165. The micro-operation cache 165 may include a specialized cache for storing micro-operations of decoded instructions as received from an instruction decoder or an instruction cache (e.g., Icache 164). In embodiments, the micro-operation cache may be communicatively connected to the Icache 164. Other configurations for the hardware processor architecture are also possible.

In embodiments, the set of example hardware processor architectures 150 may include a second hardware processor architecture 170. Aspects of the second hardware processor architecture 170 relate to an Icache 174 including a dynamic hint cache 177. The second hardware processor architecture 170 may include a CPU core 171 having a microprocessor 172 for processing a set of instructions stored in the Icache 174. As described herein, aspects of the disclosure relate to the recognition that it may be desirable to maintain instructions for execution of a program separate from other data to facilitate efficient memory access management. Accordingly, in embodiments, the Icache 174 may be configured to include a dynamic hint cache 177. The dynamic hint cache 177 may be configured to maintain a set of hints derived based on operation of the set of instructions during execution. In embodiments, the CPU core 171 may include a micro-operation cache 175 for storing micro-operations of decoded instructions. The micro-operation cache 175 may be communicatively connected to the Icache 174. Other configurations for the hardware processor architecture are also possible.

In embodiments, the set of example hardware processor architectures 150 may include a third hardware processor architecture 180. Aspects of the third hardware processor architecture 180 relate to a micro-op cache 185 including a static hint cache 186. The third hardware processor architecture 180 may include a CPU core 181 having a microprocessor 182 for processing a set of instructions stored in the Icache 184. In embodiments, the micro-op cache 185 may include a specialized cache for maintaining decoded micro-operations, such that if a previously executed instruction (e.g., macroinstruction) is executed again, the microprocessor 182 can directly access the decoded micro-operations from the micro-op cache 185 without needing to re-decode the micro-operations. As described herein, in certain embodiments, the micro-op cache 185 may be configured to include the static hint cache 186. The static hint cache 186 may be configured to maintain a set of hints derived from the set of instructions prior to runtime. In certain embodiments, inclusion of the static hint cache 186 within the micro-op cache 185 may be associated with processing efficiency. For instance, in certain embodiments, the microprocessor 182 may be configured to access hint data stored in static hint cache 186 as well as decoded micro-operation data maintained in the micro-op cache 185 in a single operation. Other configurations for the hardware processor architecture are also possible.

In embodiments, the set of example hardware processor architectures 150 may include a fourth hardware processor architecture 190. Aspects of the fourth hardware processor architecture 190 relate to a micro-op cache 195 including a dynamic hint cache 198. The fourth hardware processor architecture 190 may include a CPU core 191 having a microprocessor 192 for processing a set of instructions stored in the Icache 194. In embodiments, the micro-op cache 195 may include a specialized cache for maintaining decoded micro-operations, such that if a previously executed instruction (e.g., macroinstruction) is executed again, the microprocessor 192 can directly access the decoded micro-operations from the micro-op cache 195 without needing to re-decode the micro-operations. As described herein, in certain embodiments, the micro-op cache 195 may be configured to include the dynamic hint cache 198. The dynamic hint cache 198 may be configured to maintain a set of hints determined based on real-time execution of the set of instructions. In certain embodiments, inclusion of the dynamic hint cache 198 within the micro-op cache 195 may be associated with processing efficiency. For instance, in certain embodiments, the microprocessor 192 may be configured to access hint data stored in dynamic hint cache 198 as well as decoded micro-operation data maintained in the micro-op cache 195 in a single operation. Other configurations for the hardware processor architecture are also possible.

Figure 2:
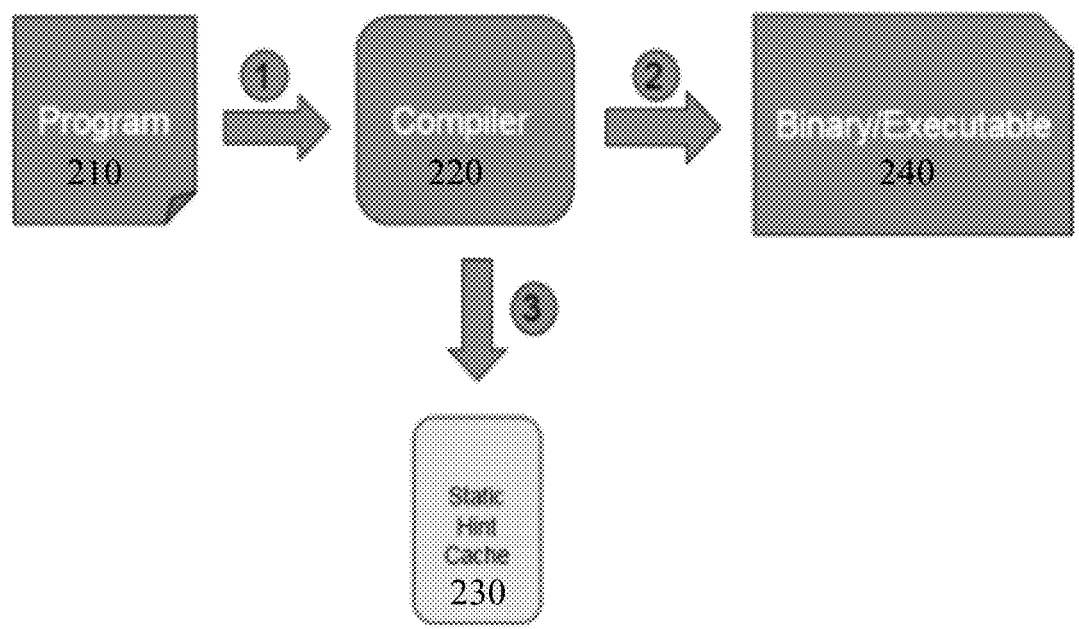
FIG. 2 depicts a flow diagram illustrating an example system for generating a set of hints for hardware processor management, according to embodiments.

FIG. 2 depicts a flow diagram illustrating an example system 200 for generating a set of hints for hardware processor management, according to embodiments. Aspects of FIG. 2 relate to performing static analysis of a set of instructions to create a set of static hint data to facilitate execution of the set of instructions by a processor. In embodiments, the set of static hint data may be generated with respect to the compilation phase of software development. For instance, a compiler or other static software analysis tool may be used to examine the set of instructions specified by a program, and generate a set of static hint data that can be accessed by a hardware processor (e.g., microprocessor) during runtime to promote processing efficiency and execution of the set of instructions.

In embodiments, the system 200 may include a program 210. The program 210 may include a specific set of ordered operations for execution of a defined task or operation. In embodiments, the program 210 may include a set of instructions (e.g., commands, tasks, requests, or other directions) represented as uncompiled source code. As an example, the program 210 may include a collection of instructions written using a human-readable programming language (e.g., Java, Javascript, C, C++, C#, Python, SQL) for execution of an enterprise management software application. In embodiments, the program 210 may be received by compiler 220 for compilation. Generally, the compiler 220 may include a computer program or a set of programs configured to translate, convert, or otherwise transform the source code of the program 210 from a first language (e.g., a high-level programming language) into a second programming language (e.g., lower-level programming language such as assembly language or machine code). In embodiments, as described herein, aspects of the disclosure relate to using the compiler 220 to perform static analysis of the program 210, and generate a set of static hint data. In embodiments, analyzing the program 210 may include identifying instructions that achieve a shared memory criterion (e.g., instructions that access similar memory regions), instructions that achieve a shared function criterion (e.g., instructions that perform similar functions), instructions that achieve a dependency criterion (e.g., instructions that rely on other instructions, functions, or parameters), or instructions that achieve a prioritization threshold (e.g., instructions that are particularly significant/important with respect to operation of the program). The identified instructions may be tagged (e.g., flagged, marked, highlighted) with annotations that indicate recommended operation configurations (e.g., instructions to be fused, performed in a particular order, or prioritized). The recommended operation configuration indications may be collected together with references to the respective code instructions to which they correspond (e.g., a first recommended operation configuration corresponds to code lines 18-25), and formatted (e.g., to be readable/interpretable by a processor) to generate the set of hint data.

In embodiments, as described herein, the compiler 220 may be configured to compile the program 210 into an executable file 240. The executable file 240 may include a binary (e.g., non-text) file or collection of object code that is configured to be interpretable and executable by a computer. In embodiments, the set of hint data generated based on the set of instructions of the program 210 may be saved together with the executable file 240. In certain embodiments, the set of hint data may be saved in a separate file that is maintained in association with the executable file 240 (e.g., as part of a single digital package, bundle, container). As described herein, upon execution of the executable file 240, the set of hint data may be loaded into a static hint cache 230. The static hint cache 230 may include a specialized cache located in the processor cache of a CPU core for maintenance of the set of static hint data. For instance, in certain embodiments, in response to the set of instructions for the executable file 240 being loaded into the instruction cache of a CPU core, the set of static hint data associated with the set of instructions of the program 210 may be loaded into the static hint cache 230. Other methods of generating and utilizing the set of hint data are also possible.

Consider the following example. The compiler 220 may receive a program 210 having a set of instructions. The compiler 220 may perform static code analysis techniques with respect to the set of instructions of the program 210, and detect that both a first instruction and a second instruction (e.g., invoked subsequent to the first instruction) are configured to access the same memory location. Accordingly, in embodiments, the compiler 220 may be configured to annotate the first and second instructions with a hint (e.g., recommended operating configuration) that indicates that the first and second instruction may be fused (e.g., such that the first and second instruction are paired for simultaneous/consecutive execution). The hint may be saved as part of a set of hint data in the executable file 240 that is generated for the program 210. Upon execution of the executable file 240, the set of hint data for the program 210 may be loaded into the static hint cache 230. In this way, the processor may access the hint data for the program 210, and fuse the first and second instructions for execution. Instruction fusion may be associated with reduced processor calculation (e.g., avoiding repeated load address calculation by fusing multiple loads for contiguous memory access). Other methods of generating and utilizing the set of hint data are also possible.

Figure 3:
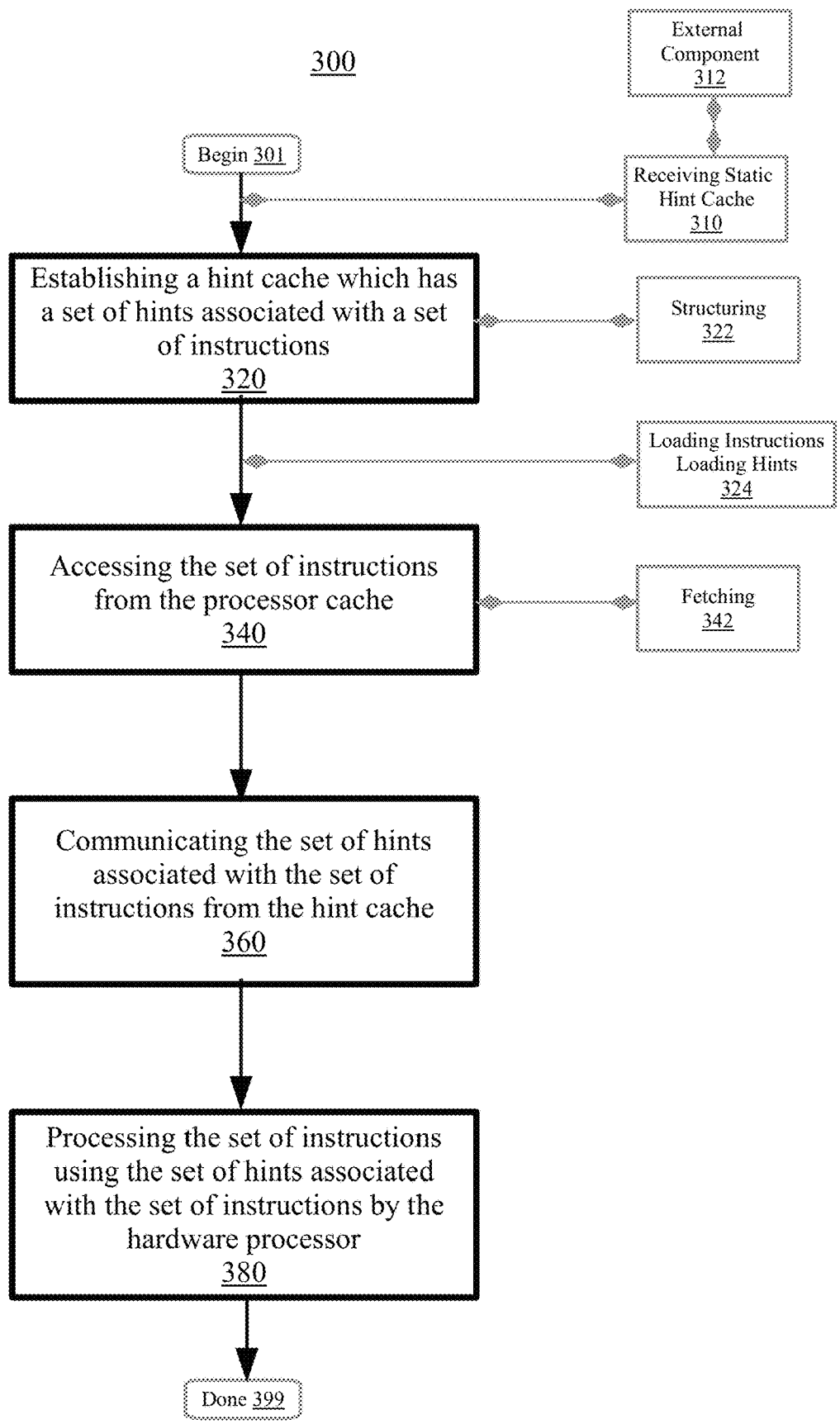
FIG. 3 is a flowchart illustrating a method for managing a hardware processor using a set of hints, according to embodiments.

FIG. 3 is a flowchart illustrating a method 300 for managing a hardware processor using a set of hints, according to embodiments. Aspects of FIG. 3 relate to using a set of static hints (e.g., derived prior to runtime) stored in the hint cache of a hardware processor to facilitate execution of a set of instructions for a computer program. One or more hints of the set of hints (e.g., each hint) may be associated with an instruction of the set of instructions. In embodiments, the set of hints may be generated with respect to the compilation phase of the computer program by a compiler. In embodiments, the set of hints may be generated based on real-time execution of the set of instructions. The set of hints may be stored in a hint cache of the hardware processor and accessed upon invocation of the set of instructions. In embodiments, aspects of FIG. 3 may substantially correspond to embodiments described elsewhere herein and illustrated in the FIGS. 1-6. The method 300 may begin at block 301.

In embodiments, the establishing, the accessing, the communicating, the processing, and other steps described herein may each occur in an automated fashion without user intervention. In embodiments, the establishing, the accessing, the communicating, the processing, and other steps described herein may be carried out by an internal hardware processor management module maintained in a persistent storage device of a local computing device (e.g., computer or server connected to a local network). In certain embodiments, the establishing, the accessing, the communicating, the processing, and other steps described herein may be carried out by an external hardware processor management module hosted by a remote computing device or server (e.g., server accessible via a subscription, usage-based, or other service model). In this way, aspects of hardware processing management may be performed using automated computing machinery without manual action. Other methods of performing the steps described herein are also possible.

In embodiments, a static hint cache may be received at block 310. The static hint cache may have a set of hints associated with a set of instructions, and be derived from a compiler/software which is configured to generate the static hint cache. Generally, receiving can include collecting, retrieving, configuring, detecting, or accepting delivery of the static hint cache. As described herein, aspects of the disclosure relate to using a compiler to analyze a set of instructions for a computer program to ascertain a set of hints (e.g., static hint data). The compiler may be configured to generate a static hint cache for storage of the set of hints. In various embodiments, the compiler can include or be associated with software, or software may generate the static hint cache separate from the compiler. In embodiments, receiving may include identifying (e.g., by the compiler) a portion of unused cache space within the processor cache of a hardware processor, and partitioning the unused cache space as the static hint cache for storage of the set of hints. In embodiments, receiving may include transferring the static hint cache (e.g., and the stored set of hints) from the binary file/executable file to the processor cache of the hardware processor. As another example, receiving can include detecting a request (e.g., from the compiler) to allocate a particular amount of memory space (e.g., 2 megabytes, 4 megabytes, 12 megabytes) as the static hint cache, and subsequently receiving the static hint cache from the compiler for storage in the processor cache. Other methods of receiving the static hint cache are also possible.

In embodiments, an external component may be used to generate a subset of the set of hints and interface with the hardware processor at block 312. The subset of the hints may include a set of static hints. Generally, generating can include producing, ascertaining, creating, or otherwise determining the subset of the set of hints. In embodiments, the external component may include a hardware element, software element, or other module separate from the hardware processor (e.g., the hardware processor configured to execute the set of instructions/receive the set of hints). As an example, in certain embodiments, the external component may include a compiler. For instance, as described herein, the compiler may be configured to analyze the set of instructions of an uncompiled computer program (e.g., source code written in a human-readable programming language), and determine a set of hints including a subset of static hints. The set of hints may be stored together with the binary/executable file output by the compiler. As an example, in embodiments, the set of hints may be maintained in a separate section of the binary/executable file. In embodiments, the external component may be configured to interface with the hardware processor. For instance, the external component may be configured to format the set of hints such that they are interpretable/readable by the hardware processor, instruct the processor how to manage (e.g., where to store, when to access) the set of hints. In embodiments, the external component may include a specialized static code analysis/diagnostic tool. Other methods of using an external component to generate a subset of hints and interface with the hardware processor are also possible.

In embodiments, the set of hints may be configured to include a particular hint. Generally, configuring can include setting-up, structuring, composing, organizing, programming, or arranging the set of hints to include a particular hint. As described herein, aspects of the disclosure relate to generating a set of hints to facilitate execution of a set of instructions by a hardware processor. In embodiments, the set of hints may include a fusion hint. The fusion hint may be an indication to merge, join, or otherwise combine one or more instructions of the set of instructions into a single operation. As an example, two separate instructions that access the same memory location may be associated with a fusion hint, such that they may be carried out simultaneously (e.g., reducing memory access operations). In embodiments, the set of hints may include a prioritization hint. The prioritization hint may be an indication that it may be desirable to perform a particular instruction in advance of other instructions or provide a particular instruction with additional computing resources. For instance, it may be determined that if a particular instruction is not performed at a particular time, program latency may occur. Accordingly, the particular instruction may be associated with a prioritization hint indicating recommended execution at the particular time. In embodiments, the set of instructions may include a load-store hint. The load-store hint may be an indication that a particular instruction (e.g., load-store instruction) is configured to perform a memory access operation, and that it may be desirable to execute this operation simultaneously with respect to another operation (e.g., to reduce wait-time associated with load-store operations). The hints described herein are intended for the purpose of illustration, and other types of hints beyond those explicitly described herein are possible and contemplated.

At block 320, a hint cache which has a set of hints associated with a set of instructions may be established. The hint cache may be established with respect to a processor cache which has the set of instructions. Generally, establishing can include formatting, creating, instituting, or otherwise providing the hint cache. As described herein, aspects of the disclosure relate to storing a set of hints in a hint cache included in a hardware processor. The hardware processor may access the set of hints stored in the hint cache to facilitate execution of a set of instructions for a computer program. The hint cache may include a portion of high-speed memory (e.g., static random access memory) configured for storage of a set of hints. The hint cache may include a first portion for storing a first subset of hints derived based on analysis of the set of instructions prior to execution (e.g., static hint data) and a second portion for storing a second subset of hints derived based on real-time execution of the set of instructions (e.g., dynamic hint data). In embodiments, establishing the hint cache may include structuring the processor cache to include the hint cache at block 322. Generally, structuring can include building, arranging, organizing, or otherwise configuring the processor cache to include the hint cache. In embodiments, structuring can include identifying a portion of the processing cache to be partitioned and used as the hint cache. According to the present disclosure, the size of the hint cache may be determined prior to the design of the hardware logic, and changing the size of the hint cache may not be achievable according to aspects described herein in certain embodiments. Since functionality of each of the hint bits can be hardcoded in the execution unit, the functionality of each type of hints may be determined during the design phase itself. Other methods of establishing and structuring the hint cache are also possible.

In embodiments, the set of instructions may be loaded into the processor cache, and the set of hints associated with the set of instructions may be loaded into the hint cache at block 324. Generally, loading can include reading, importing, receiving, storing, or ingesting the set of instructions/set of hints. In embodiments, loading the set of instructions into the processor cache may include receiving a request to execute a particular computer program. In response to receiving the request to execute the computer program, the instructions (e.g., a portion of the instructions) for the specified program may be read from a memory location (e.g., random-access memory, volatile or non-volatile storage device) and copied into the processor cache for execution. In embodiments, in response to loading of the set of instructions into the processor cache, a set of hints associated with the set of instructions may be identified and loaded into the hint cache. As an example, loading the set of hints may include extracting the set of hints associated with the set of instructions from a binary/executable file (e.g., the binary/executable file that includes the set of instructions), and storing them in the hint cache. As described herein, the set of hints may include references or annotations mapping particular hints of the set of hints to respective instructions of the set of instructions. In this way, both the set of instructions as well as the set of hints corresponding to the set of instructions may be accessible to the hardware processor to facilitate execution of the computer program. Other methods of loading the set of instructions into the processor cache and loading the set of hints associated with the set of instructions into the hint cache are also possible.

At block 340, the set of instructions may be accessed from the processor cache. Generally, accessing can include acquiring, obtaining, gathering, or otherwise retrieving the set of instructions from the processor cache. As described herein, aspects of the disclosure relate to implementing aspects of a computer program based on a set of instructions. Accordingly, in embodiments, a hardware processor may be configured to access the set of instructions for the computer program that are stored in the processor cache (e.g., for processing/execution). In embodiments, accessing may include submitting a "read" request for the set of instructions to the processor cache. The processor cache may search the data stored in the cache for the set of instructions specified by the processor. In response to finding the set of instructions (e.g., a cache hit), the processor cache may transmit a reply to the hardware processor specifying where (e.g., the cache memory address, specific cache lines) the set of instructions are saved. The hardware processor may then perform a read operation with respect to the cache memory address specified by the processor cache in order to obtain the set of instructions for processing/execution. In certain embodiments, the hardware processor may be configured to directly search the processor cache for the set of instructions. In the event that the set of instructions are not found in the processor cache (e.g., a cache miss) the hardware processor may be configured to access a binary/executable file (e.g., corresponding to the set of instructions to be executed), main memory, or a storage device to acquire the set of instructions. Other methods of accessing the set of instructions from the processor cache are also possible.

In embodiments, a respective subset of the set of hints may be fetched from the hint cache at block 342. The subset of the set of hints may be fetched when fetching the respective subset of the set of instructions from the processor cache. Generally, fetching can include acquiring, obtaining, gathering, or otherwise retrieving the respective subset of the set of hints from the hint cache. As described herein, aspects of the disclosure relate to using a set of hints to facilitate execution of the set of instructions. Accordingly, in embodiments, a subset of the set of hints may be fetched from the hint cache together with the subset of the set of instructions to which they correspond. For instance, in embodiments, when a fetch is performed for a subset of instructions, the hardware processor may be configured to verify whether any hint data is associated with the subset of fetched instructions. In the event that hint data associated with the subset of fetched instructions is detected, it may be gathered and loaded into the hint cache. As an example, the hardware processor may be configured to gather a subset of instructions that relate to implementation of a data submission feature in a social networking program. Accordingly, when the hardware processor accesses the processor cache to fetch the subset of instructions, it may detect a tag or annotation associated with the subset of instructions that indicates a subset of hint data corresponding to code lines 93-111. As such, the hardware processor may access the hint cache to retrieve the subset of hint data corresponding to the subset of instructions (e.g., as part of the same fetch operation used to collect the set of instructions). The subset of hint data may be saved or stored in the hint cache for access by the hardware processor. Other methods of fetching the subset of the set of hints from the hint cache when fetching the respective subset of the set of instructions from the processor cache are also possible.

At block 360, the set of hints associated with the set of instructions may be communicated from the hint cache. Generally, communicating can include transmitting, relaying, calling, sending, implementing, or otherwise conveying the set of hints associated with the set of instructions. As described herein, aspects of the disclosure relate to using a set of hints to facilitate execution of a set of instructions with respect to a hardware processor. Accordingly, in embodiments, aspects of the disclosure relate to communicating the set of hints from the hint cache to the hardware processor. In embodiments, communicating the set of hints may include invoking (e.g., calling) implementation or usage of a subset of hints (e.g., stored in the hint cache) that are mapped to a particular instruction or set of instructions. Consider the following example. A subset of instructions may be loaded into a hardware processor for execution. The subset of instructions may be associated with three different subsets of hint data; code line 4 may be associated with a first hint, code line 19 may be associated with a second hint, and code line 62 may be associated with a third hint. The hardware processor may detect and analyze each of the three subsets of hint data, and determine a recommended operation indicated by the subsets of hint data for the designated code portions. As examples, the first hint may indicate that execution of code line 4 may require access to a particular external sub-routine, such that it may be desirable to load the designated external-subroutine into the processor cache prior to execution of code line 4 (e.g., to facilitate streamlined processing). Other methods of communicating the set of hints from the hint cache are also possible.

At block 380, the set of instructions may be processed by the hardware processor using the set of hints associated with the set of instructions. Generally, processing can include analyzing, invoking, implementing, executing, or otherwise performing or managing the set of instructions by the hardware processor. As described herein, aspects of the disclosure relate to using a set of hint data to facilitate execution of a set of instructions. Accordingly, in embodiments, a hardware processor may be configured to use the set of hints to process the set of instructions. In embodiments, processing may include performing one or more arithmetic, logical, control, or input/output operations specified by the instructions together with the recommended operations indicated by the set of hints. In embodiments, processing may include carrying-out the set of instructions in the manner indicated by the set of hints. For instance, instructions that are associated with hints that recommend fusing may be performed consecutively/simultaneously, instructions associated with hints that designate a recommended sequence may be performed in the specified order, instructions that are dependent on other functions, modules, instructions, or hardware/software components may be prepared together with the related elements, and the like. Other methods of processing the set of instructions by the hardware processor using the set of hints are also possible.

Consider the following example. A compiler may receive a set of uncompiled source code including a set of instructions. The compiler may analyze the set of instructions of the program, and determine that it may be desirable to prioritize execution of a first instruction at code line 46 based on the nature of the instruction. As an example, the first instruction at code line 46 may relate to loading a set of parameter values used to determine which branch direction of the code to execute. The compiler may generate a set of hint data in which the first instruction at code line 46 is marked as a priority instruction, and store the set of hint data in a separate section of the binary file created for the set of instructions. As described herein, a hint cache (e.g., dynamic hint cache) may be established within the processor cache of a hardware processor. In embodiments, in response to receiving a request (e.g., from a user) to execute the binary file, the set of instructions for the binary file may be loaded into the processor cache, and the set of hint data associated with the set of instructions may be loaded into the hint cache. Upon invocation of the set of instructions, the hardware processor may be configured to analyze the set of instructions and detect the set of hint data with respect to the first instruction. The hardware processor may fetch the set of hint data from the hint cache, and ascertain that the set of hint data indicates that the first instruction at code line 46 is marked as a priority instruction, such that it may be desirable to prioritize (e.g., allocate more resources for execution, expedite execution of the first instruction with respect to other instructions) execution of the first instruction at code line 46. Accordingly, the hardware processor may process the set of instructions such that the first instruction is prioritized for execution. In certain embodiments, hint data indicating instruction priority may be saved in a dynamic hint cache. Other methods of using the set of hint data to facilitate execution of the set of instructions are also possible.

Method 300 concludes at block 399. As described herein, aspects of method 300 relate to using a set of hints stored in the hint cache of a hardware processor to facilitate execution of a set of instructions for a computer program. Aspects of method 300 may provide performance or efficiency benefits for instruction performance efficiency. As an example, instructions that call or invoke external data elements may be anticipated using the set of hints, and the related data elements may be loaded into the processor cache to increase cache hit likelihoods. Altogether, leveraging hints related to the set of instructions of a computer program may be associated with streamlined instruction performance, program sequence flexibility, and processing efficiency.

Figure 4:
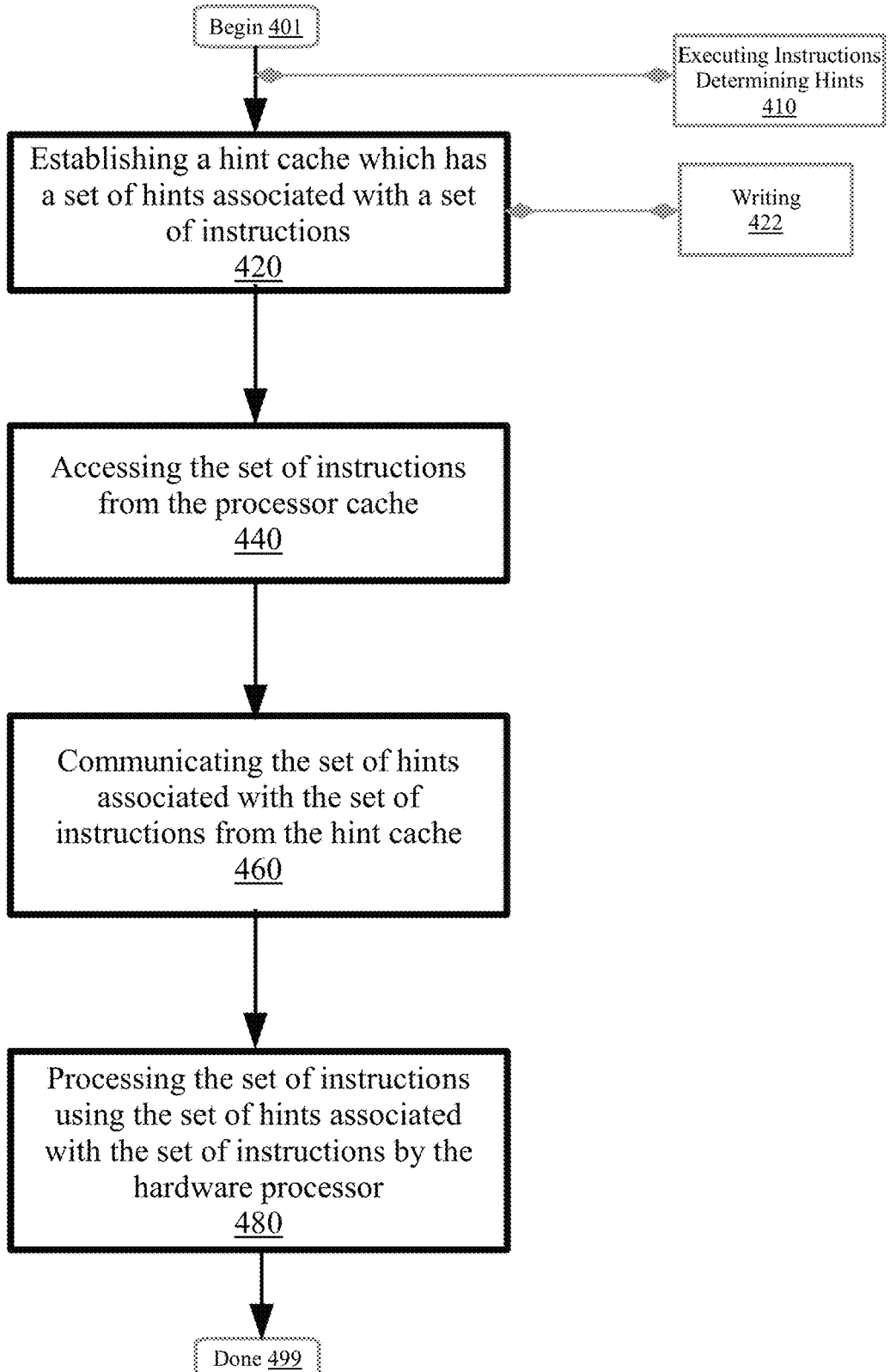
FIG. 4 is a flowchart illustrating a method for managing a hardware processor using a set of hints, according to embodiments.

FIG. 4 is a flowchart illustrating a method 400 for managing a hardware processor using a set of hints, according to embodiments. Aspects of FIG. 4 relate to using a set of dynamic hints (e.g., derived based on real-time execution of the set of instructions) stored in the hint cache of a hardware processor to facilitate execution of a set of instructions for a computer program. One or more hints of the set of hints (e.g., each hint) may be associated with an instruction of the set of instructions. In embodiments, the set of hints may be generated with respect to the compilation phase of the computer program by a compiler. In embodiments, the set of hints may be generated based on real-time execution of the set of instructions. The set of hints may be stored in a hint cache of the hardware processor and accessed upon invocation of the set of instructions. In embodiments, aspects of FIG. 4 may substantially correspond to embodiments described elsewhere herein and illustrated in the FIGS. 1-6. At block 420, a hint cache which has a set of hints associated with a set of instructions may be established. At block 440, the set of instructions may be accessed from the processor cache. At block 460, the set of hints may be communicated from the hint cache. At block 480, the set of instructions may be processed using the set of hints. The method 400 may begin at block 401.

In embodiments, the establishing, the accessing, the communicating, the processing, and other steps described herein may each occur in a dynamic fashion to streamline hardware processor management. For instance, the establishing, the accessing, the communicating, the processing, and other steps described herein may occur in real-time, ongoing, or on-the-fly. As an example, one or more steps described herein may be performed simultaneously (e.g., accessing the set of instructions from the processor cache may be performed at the same time as communicating the set of hints from the hint cache) in order to streamline (e.g., facilitate, promote, enhance) instruction execution by a hardware processor.

In embodiments, the set of instructions may be executed by the hardware processor and a set of hints may be determined based on the execution of the set of instructions at block 410. As described herein, aspects of the disclosure relate to generating a set of dynamic hint data based on real-time performance of the set of instructions. Accordingly, in embodiments, the set of instructions may be executed by the hardware processor, and the performance of the instructions may be used to formulate the set of dynamic hint data. Generally, executing can include processing, instantiating, invoking, implementing, carrying-out, or otherwise performing the set of instructions by the hardware processor. In embodiments, executing can include fetching an instruction (e.g., from the processor cache), decoding the instruction and retrieving operands, performing an ALU (arithmetic logic unit) operation, accessing memory (e.g., performing a load or store operation), writing back the result to a register file, or updating the program counter holding the address of the executed instruction. Based on execution of the set of instructions, the set of hints may be determined. Generally, determining can include generating, formulating, learning, deriving, or otherwise ascertaining the set of hints. In embodiments, determining can include examining the operation of the set of instructions and identifying aspects of the operation that fail to achieve an execution efficiency threshold (e.g., processing speed below a threshold value, redundancy in operations, operation sequencing error). As examples, the parameters, functions, branch paths, resource allocations, memory access patterns, operation sequences, and other elements of the instruction execution may be analyzed, and the execution efficiency of each element may be evaluated with respect to the execution efficiency threshold. In response to identifying aspects of the operation that fail to achieve the execution efficiency threshold, the set of dynamic hint data may be generated. In embodiments, the dynamic hint data may indicate instruction branches to avoid (e.g., due to long processing times) instructions to be fused, instructions to be performed in a different sequence, or other recommendations for subsequent execution cycles. Other methods of executing the set of instructions and determining the set of hints are also possible.

In embodiments, the set of hints may be written in a dynamic hint cache at block 422. The set of hints may be written in the dynamic hint cache in response to determining the set of hints based on executing the set of instructions. Generally, writing can include storing, loading, saving, logging, or otherwise recording the set of hints in the dynamic hint cache. As described herein, aspects of the disclosure relate to a processor cache having both a static hint cache (e.g., for maintaining static hint data derived prior to instruction execution) and a dynamic hint cache (e.g., for maintaining dynamic hint data derived based on real-time execution of the set of instructions). Accordingly, in response to determining the set of hints based on executing the set of instructions (e.g., dynamic hint data), the set of hints may be stored in the dynamic hint cache. In embodiments, writing may include saving the set of hints in the dynamic hint cache. For instance, the dynamic hint cache may be configured to retain the set of hints for a particular set of instructions in the dynamic hint cache as long as the set of instructions remain in the processor cache, and be configured to delete the set of hints from the dynamic hint cache upon loading a new set of instructions into the dynamic hint cache. In certain embodiments, the set of hints may be saved in non-volatile memory (e.g., solid state drive, hard drive), and reloaded into the dynamic hint cache in the event that the set of instructions that correspond to the set of hints are invoked by the hardware processor. Other methods of writing the set of hints into the dynamic hint cache are also possible.

Consider the following example. A set of instructions corresponding to a billing management program may be loaded into the processor cache of a hardware processor. The hardware processor may fetch the instructions from the processor cache, and begin executing the set of instructions. Once the latency of the branch instruction is determined by the hardware, the hardware can insert appropriate hints into the dynamic hint cache so that the next invocation of the branch can be handled by executing (all of) the instructions at a priority which the branches is waiting upon. Other methods of using the set of dynamic hint data are also possible. The method 400 may end at block 499.

Figure 5:
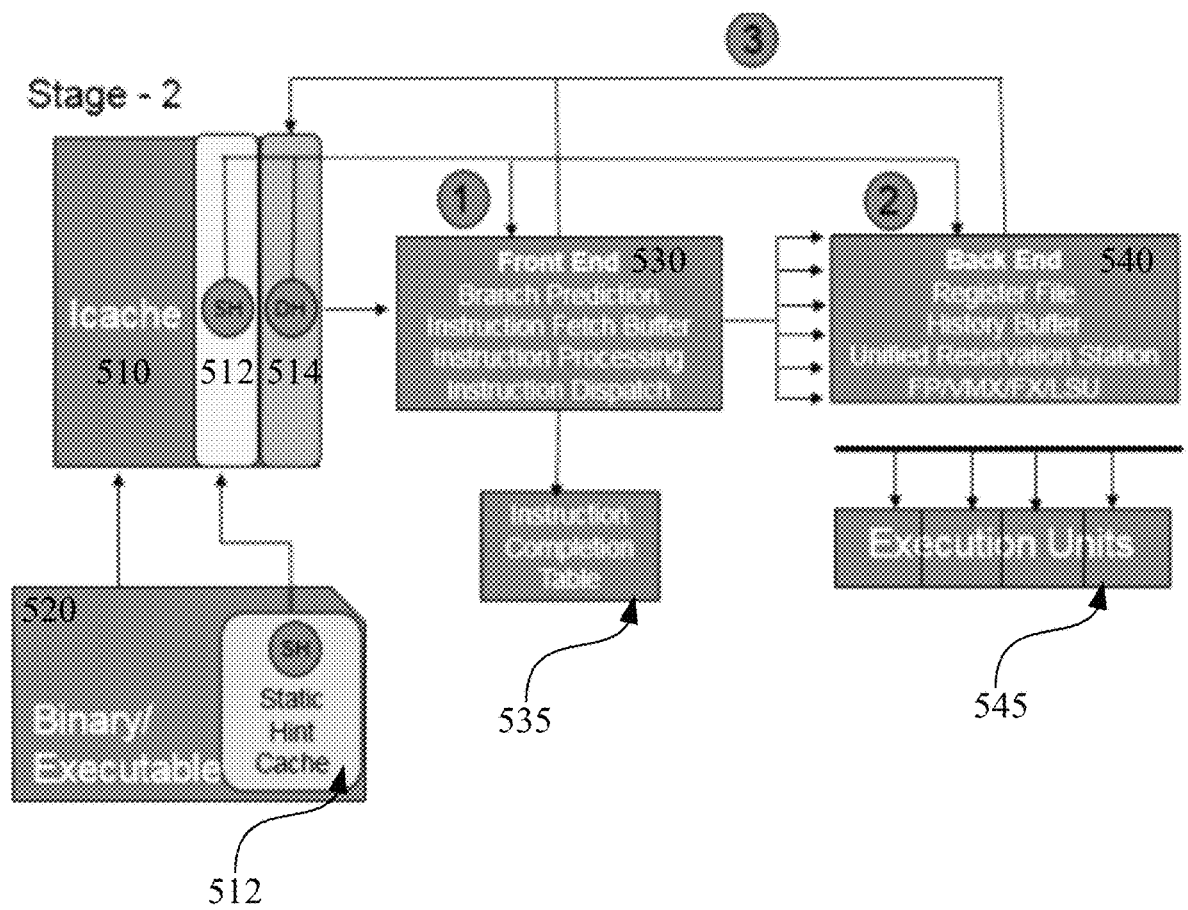
FIG. 5 depicts a flow diagram illustrating an example system architecture for utilizing a set of hints to facilitate management of a set of instructions by a hardware processor, according to embodiments.

FIG. 5 depicts a flow diagram illustrating an example system architecture 500 for utilizing a set of hints to facilitate management of a set of instructions by a hardware processor, according to embodiments. Aspects of FIG. 5 relate to a system architecture 500 having an information cache (Icache) 510 including both a static hint cache 512 for storing a set of static hint data (e.g., subset of hint data derived prior to instruction runtime) and a dynamic hint cache 514 for storing a set of dynamic hint data (e.g., subset of hint data derived based on real-time execution of the set of instructions). In embodiments, the static hint cache 512 may be loaded into the Icache 510 when the set of instructions are loaded into the Icache 510. As shown in FIG. 5, the static hint cache 512 may be loaded into the Icache 510 from a binary/executable file 520 including the set of instructions. In embodiments, the dynamic hint cache 514 may be generated by the hardware processor and written to the Icache 510 based on dynamic program execution. Aspects of the system architecture 500 may substantially correspond to other embodiments described herein and illustrated in the FIGS. 1-6.

In embodiments, the example system architecture 500 may include a front-end processor 530 that is communicatively-connected to the Icache 510. The front-end unit(s) 530 may include a unit configured to facilitate data transfer between the Icache 510 and other microarchitecture units of the processor (e.g., instruction decode unit, instruction sequencing unit, execution unit, completion unit). In embodiments, the front-end unit 530 may be configured to use static and dynamic hint cache bits (e.g., data objects representing the set of hint data) from the static hint cache 512 and the dynamic hint cache 514, respectively, to facilitate instruction delivery/dispatch and fusion of the set of instructions using branch prediction, instruction fetch buffer, instruction processing, and instruction dispatch techniques. The front-end units 530 may be configured to update an instruction completion table 535 to indicate, in certain example embodiments, the completion time and status of particular instructions of the set of instructions.

In embodiments, the example system architecture 500 may include a back-end unit(s) 540. The back-end units 540 may include a processing unit configured to perform specialized processing operations with respect to the set of instructions. In embodiments, the back-end units 540 may be configured to use the static and dynamic hint cache bits from the static hint cache 512 and the dynamic hint cache 514, respectively, to prioritize instruction invocation and execution. In embodiments, the back-end units 540 may be configured to generate the set of dynamic hint data, and write the set of dynamic hint data back to the dynamic hint cache 514 to facilitate subsequent execution of the set of instructions. In certain embodiments, the set of dynamic hint data may be generated and written by the front-end processor 530 based on the instruction completion table 535. In embodiments, the example system architecture 500 may include a set of execution units 545. The set of execution units 545 may include portions of a central processing unit to perform the operations and calculations of a computer program. In embodiments, the set of execution units 545 may be configured to process and execute the set of instructions of a computer program using the set of hints. Other methods of managing the set of hint data using the front-end processor 530, back-end units 540, and other components are also possible.

In embodiments, a set of bits (e.g., hint cache bits) may be configured to indicate the set of hints. Generally, configuring can include arranging, organizing, setting-up, or formatting the set of hint cache bits. The set of hint cache bits may include data objects that represent one or more hints of the set of hint data (e.g., dynamic hint data or static hint data). In embodiments, configuring may include organizing the set of hint cache bits according to one or more formatting types specific to an instruction category (e.g., load/store type instructions may have a different hint formatting type than fixed-point unit instruction). In embodiments, the set of hint cache bits may be organized using an 8-bit hint format for load/store type instruction categories. The 8-bit hint format may include a buffer queue, in which hint cache bits for upcoming instructions cycle into the buffer queue, are processed by the hardware-processor, and then cycle out as new hint cache bits enter. For example, Bit 0 may provide a hint that instructs the hardware processor to prioritize execution of a particular instruction. Bits 1 and 2 may provide hints that instruct the hardware processor to fuse (e.g., pair) two or more instruction loads. Bit 3 may provide a hint indicating that a particular instruction load is followed by another load with a subsequent address (e.g., instructions may be performed in sequence), and Bit 4 may provide a hint indicating an instruction that can be merged with a previous instruction to access a load/store queue. As the set of hint cache bits are associated with the set of instructions, the 64 bits or 32 bits or any hint bits of any size hint cache bits may be loaded into the Icache 510 seamlessly (e.g., without affecting the performance aspects of the instructions). Other methods of configuring the set of hint cache bits are also possible.

Figure 6:
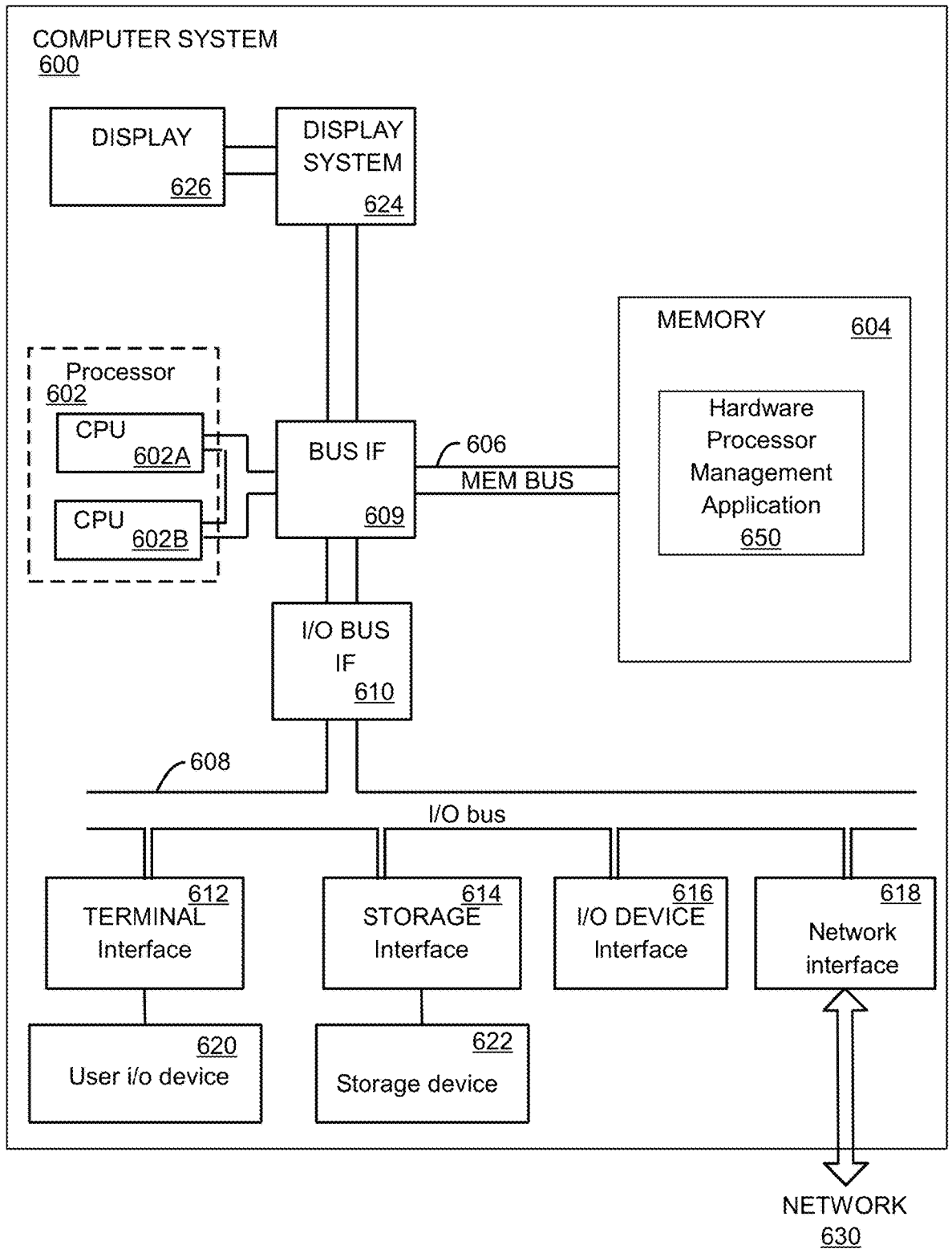
FIG. 6 depicts a high-level block diagram of a computer system for implementing various embodiments of the present disclosure, according to embodiments.

FIG. 6 depicts a high-level block diagram of a computer system for implementing various embodiments of the present disclosure, according to embodiments. The mechanisms and apparatus of the various embodiments disclosed herein apply equally to any appropriate computing system. The major components of the computer system 600 include one or more processors 602, a memory 604, a terminal interface 612, a storage interface 614, an I/O (Input/Output) device interface 616, and a network interface 618, all of which are communicatively coupled, directly or indirectly, for inter-component communication via a memory bus 606, an I/O bus 608, bus interface unit 609, and an I/O bus interface unit 610.

The computer system 600 may contain one or more general-purpose programmable central processing units (CPUs) 602A and 602B, herein generically referred to as the processor 602. In embodiments, the computer system 600 may contain multiple processors; however, in certain embodiments, the computer system 600 may alternatively be a single CPU system. Each processor 602 executes instructions stored in the memory 604 and may include one or more levels of on-board cache.

In embodiments, the memory 604 may include a random-access semiconductor memory, storage device, or storage medium (either volatile or non-volatile) for storing or encoding data and programs. In certain embodiments, the memory 604 represents the entire virtual memory of the computer system 600, and may also include the virtual memory of other computer systems coupled to the computer system 600 or connected via a network. The memory 604 can be conceptually viewed as a single monolithic entity, but in other embodiments the memory 604 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 604 may store all or a portion of the various programs, modules and data structures for processing data transfers as discussed herein. For instance, the memory 604 can store a hardware processor management application 650. In embodiments, the hardware processor management application 650 may include instructions or statements that execute on the processor 602 or instructions or statements that are interpreted by instructions or statements that execute on the processor 602 to carry out the functions as further described below. In certain embodiments, the hardware processor management application 650 is implemented in hardware via semiconductor devices, chips, logical gates, circuits, circuit cards, and/or other physical hardware devices in lieu of, or in addition to, a processor-based system. In embodiments, the hardware processor management application 650 may include data in addition to instructions or statements.

The computer system 600 may include a bus interface unit 609 to handle communications among the processor 602, the memory 604, a display system 624, and the I/O bus interface unit 610. The I/O bus interface unit 610 may be coupled with the I/O bus 608 for transferring data to and from the various I/O units. The I/O bus interface unit 610 communicates with multiple I/O interface units 612, 614, 616, and 618, which are also known as I/O processors (IOPs) or I/O adapters (IOAs), through the I/O bus 608. The display system 624 may include a display controller, a display memory, or both. The display controller may provide video, audio, or both types of data to a display device 626. The display memory may be a dedicated memory for buffering video data. The display system 624 may be coupled with a display device 626, such as a standalone display screen, computer monitor, television, or a tablet or handheld device display. In one embodiment, the display device 626 may include one or more speakers for rendering audio. Alternatively, one or more speakers for rendering audio may be coupled with an I/O interface unit. In alternate embodiments, one or more of the functions provided by the display system 624 may be on board an integrated circuit that also includes the processor 602. In addition, one or more of the functions provided by the bus interface unit 609 may be on board an integrated circuit that also includes the processor 602.

The I/O interface units support communication with a variety of storage and I/O devices. For example, the terminal interface unit 612 supports the attachment of one or more user I/O devices 620, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 620 and the computer system 600, and may receive output data via the user output devices. For example, a user interface may be presented via the user I/O device 620, such as displayed on a display device, played via a speaker, or printed via a printer.

The storage interface 614 supports the attachment of one or more disk drives or direct access storage devices 622 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 622 may be implemented via any type of secondary storage device. The contents of the memory 604, or any portion thereof, may be stored to and retrieved from the storage device 622 as needed. The I/O device interface 616 provides an interface to any of various other I/O devices or devices of other types, such as printers or fax machines. The network interface 618 provides one or more communication paths from the computer system 600 to other digital devices and computer systems; these communication paths may include, e.g., one or more networks 630.

Although the computer system 600 shown in FIG. 6 illustrates a particular bus structure providing a direct communication path among the processors 602, the memory 604, the bus interface 609, the display system 624, and the I/O bus interface unit 610, in alternative embodiments the computer system 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 610 and the I/O bus 608 are shown as single respective units, the computer system 600 may, in fact, contain multiple I/O bus interface units 610 and/or multiple I/O buses 608. While multiple I/O interface units are shown, which separate the I/O bus 608 from various communications paths running to the various I/O devices, in other embodiments, some or all of the I/O devices are connected directly to one or more system I/O buses.

In various embodiments, the computer system 600 is a multi-user mainframe computer system, a single-user system, or a server computer or similar device that has little or no direct user interface, but receives requests from other computer systems (clients). In other embodiments, the computer system 600 may be implemented as a desktop computer, portable computer, laptop or notebook computer, tablet computer, pocket computer, telephone, smart phone, or any other suitable type of electronic device.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A hardware processor architecture, the hardware processor architecture comprising:
    a processor cache configured to manage a set of instructions, wherein the set of instructions includes at least one instruction selected from the group consisting of instructions that achieve a shared memory criterion, instructions that achieve a dependency criterion, and instructions that achieve a prioritization threshold, the processor cache comprising:
        a plurality of hint caches configured to manage a set of hints associated with the set of instructions, wherein the set of hints includes dynamic hint data generated when an operation fails to achieve an execution efficiency threshold, wherein the dynamic hint data indicates instruction branches to avoid, and static hint data generated when the at least one instruction is identified, wherein the plurality of hint caches comprises:
            a static hint cache that includes the static hint data; and
            a dynamic hint cache that includes the dynamic hint data.

2. The hardware processor architecture of claim 1, wherein the processor cache has an instruction cache.

3. The hardware processor architecture of claim 1, wherein the processor cache has a micro-op cache.

4. The hardware processor architecture of claim 1, wherein the static hint cache is derived from an application program binary.

5. The hardware processor architecture of claim 1, wherein the set of hints includes one or more hint bits to indicate a nature of one or more instructions of the set of instructions.

6. The hardware processor architecture of claim 1, wherein the static hint data further indicates resource requirements for one or more instructions from the set of instructions.

7. The hardware processor architecture of claim 1, further comprising:
    a front-end unit configured to use the dynamic hint data and the static hint data to deliver the set of instructions; and
    a back-end unit configured to use the dynamic hint data and the static hint data to prioritize execution of the set of instructions.

8. A computer-implemented method for managing a hardware processor having a processor cache, the method comprising:
    identifying a set of instructions in the processor cache, wherein the instructions include at least one instruction selected from the group consisting of instructions that achieve a shared memory criterion, instructions that achieve a dependency criterion, and instructions that achieve a prioritization threshold;
    generating static hint data associated with the set of instructions;
    establishing a static hint cache that includes the static hint data;
    examining an operation of the set of instructions;
    identifying aspects of the operation that fail to achieve an execution efficiency threshold;
    generating dynamic hint data based on the identification of the aspects of the operation that fail to achieve the execution efficiency threshold, wherein the dynamic hint data indicates instruction branches to avoid;
    establishing a dynamic hint cache that includes the dynamic hint data;
    accessing, from the processor cache, the set of instructions;
    communicating, from the dynamic hint cache and the static hint cache, the dynamic hint data and the static hint data;
    delivering, by a front-end unit, the set of instructions using the dynamic hint data and the static hint data;
    prioritizing, by a back-end unit, the set of instructions using the dynamic hint data and the static hint data; and
    processing, by the hardware processor, the set of instructions using the dynamic hint data and the static hint data.

9. The method of claim 8, further comprising:
    structuring the processor cache to include a hint cache that includes the dynamic hint cache and the static hint cache.

10. The method of claim 9, further comprising:
    loading, in the processor cache, the set of instructions; and
    loading, in the hint cache, the dynamic hint data and the static hint.

11. The method of claim 10, further comprising:
    receiving the static hint cache which has the static hint data, wherein the static hint cache is derived from a compiler which is configured to generate the static hint data.

12. The method of claim 9, further comprising:
    executing, by the hardware processor, the set of instructions; and
    determining, based on the execution of the set of instructions, additional dynamic hint data.

13. The method of claim 12, further comprising:
writing, in the dynamic hint cache, the additional dynamic hint data in response to the determining the additional dynamic hint data based on the execution of the set of instructions.

14. The method of claim 8, wherein a respective subset of the dynamic hint data and the static hint data corresponds with a respective subset of the set of instructions.

15. The method of claim 14, further comprising:
fetching the respective subset from the dynamic hint cache and the static hint cache when fetching the respective subset of the set of instructions from the processor cache.

16. The method of claim 8, further comprising:
configuring the dynamic hint data and the static hint data to include a particular hint, wherein the particular hint is selected from the group consisting of: a fusion hint, a prioritization hint, and a load-store hint.

17. The method of claim 8, further comprising:
configuring a set of bits to indicate the dynamic hint data and the static hint data.

18. A system of hardware processor management, the system comprising:
a hardware processor for processing a set of instructions using a set of hints associated with the set of instructions, the hardware processor including:
a processor cache configured to manage the set of instructions which includes access to the set of instructions, wherein the set of instructions includes at least one instruction selected from the group consisting of instructions that achieve a shared memory criterion, instructions that achieve a dependency criterion, and instructions that achieve a prioritization threshold, the processor cache comprising a plurality of hint caches configured to manage the set of hints associated with the set of instructions, which includes communication of the set of hints associated with the set of instructions, wherein the set of hints includes dynamic hint data generated when an operation fails to achieve an execution efficiency threshold, wherein the dynamic hint data indicates instruction branches to avoid, and static hint data generated when the set of instructions is identified, wherein the plurality of hint caches comprises:
a static hint cache that includes the static hint data; and
a dynamic hint cache that includes the dynamic hint data.

19. The system of claim 18, further comprising:
an external component to generate a subset of the set of hints and interface with the hardware processor, wherein the subset of the set of hints includes a set of static hints.

20. The system of claim 18, further comprising:
a front-end unit configured to use the dynamic hint data and the static hint data to deliver the set of instructions; and
a back-end unit configured to use the dynamic hint data and the static hint data to prioritize execution of the set of instructions.

* * * * *